United States Patent
Al-Kazily et al.

(10) Patent No.: US 7,218,406 B2
(45) Date of Patent: May 15, 2007

(54) MAILBOX PRINTING SERVICES FOR INFORMATION APPLIANCES

(75) Inventors: Binnur Al-Kazily, Star, ID (US); Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

(21) Appl. No.: 09/814,284

(22) Filed: Mar. 21, 2001

(65) Prior Publication Data

US 2002/0135797 A1 Sep. 26, 2002

(51) Int. Cl.
  *G06F 13/00* (2006.01)
  *G06K 15/02* (2006.01)
(52) U.S. Cl. .................. 358/1.15; 358/402; 358/403
(58) Field of Classification Search .......... 358/1.1–1.9, 358/1.11–1.18, 402, 403; 455/556.2; 707/1; 709/206, 248, 217
See application file for complete search history.

(56) References Cited

U.S. PATENT DOCUMENTS

| | | | |
|---|---|---|---|
| 5,606,594 A * | 2/1997 | Register et al. .......... 455/556.2 |
| 6,246,211 B1 * | 6/2001 | Dalton et al. ............... 320/114 |
| 6,256,666 B1 * | 7/2001 | Singhal ...................... 709/217 |
| 6,397,261 B1 * | 5/2002 | Eldridge et al. ............. 713/171 |
| 6,430,601 B1 * | 8/2002 | Eldridge et al. ............. 709/206 |
| 6,438,585 B2 * | 8/2002 | Mousseau et al. .......... 709/206 |
| 6,587,691 B1 * | 7/2003 | Granstam et al. ........... 455/457 |
| 6,738,841 B1 * | 5/2004 | Wolff ......................... 710/62 |
| 6,744,528 B2 * | 6/2004 | Picoult et al. ............. 358/1.15 |

* cited by examiner

*Primary Examiner*—King Y. Poon

(57) ABSTRACT

A system and method is provided for printing a document stored on a remote computer using an information appliance. The method includes providing a connection between an information appliance and a remote computer, wherein the remote computer stores one or more documents, and receiving synchronization information from the remote computer. The synchronization information includes one or more reference information, where each reference information identifies a document stored on the remote computer. The method also includes displaying the reference information on an information appliance display, receiving a print request for one or more documents selected from the displayed reference information, and, responsive to receiving the command to print, transmitting a print request to a nearby printer. The system includes an information appliance that is synchronized with reference information identifying the documents stored on a remote computer. The information appliance displays the reference information on a coupled display and receives a selection of one or more reference information identifying one or more documents. The information appliance also receives a request to print the selected documents. The information appliance then transmits a print request to a nearby printer.

25 Claims, 5 Drawing Sheets

MAILBOX PRINTING SERVICES FOR INFORMATION APPLIANCES

BACKGROUND

1. Field

The present invention relates generally to computer systems and, more particularly, to a system and method for printing documents on a printer using an information appliance.

2. Description of the Related Art

Technological advances in computers, computer software, and related technologies have enabled a computer to function as a repository for enormous amounts of data. As more and more data are stored on computers, being able to access and disseminate the data becomes increasingly important. Even with the technological advances and the touting of the "paperless office," printing the data and distributing the printed data still remains a prevalent method of dissemination. Furthermore, as society becomes more mobile, there is an increasing need to be able to access, print, and disseminate the data at locations remote from where the data is stored.

One conventional method involves printing the data on a printer connected to the computer. The printed data is then carried to a remote location and appropriately disseminated. For example, a salesperson can store product documents (e.g., brochures) on a computer in his or her office. The salesperson can then print out the necessary product documents on a printer in the office that is coupled to the computer. The salesperson can then carry the printed documents to a client's facility and distribute the product documents, for example, during a sales meeting. Depending on the volume of data, the salesperson may end up carrying a large amount of printed material.

Another method involves the use of a portable or laptop computer. For example, a salesperson can load and store the product documents on a laptop computer's hard disk. The salesperson can then carry the laptop computer with him or her to a client's facility. The salesperson can print the product documents on the client's printer located at the client's facility. While this method alleviates the problem of having to carry large amounts of printed materials, there is the problem and inconvenience of having to configure the laptop computer to communicate with the printer so that the product documents can be printed.

Configuring a computer to communicate with a printer typically involves finding a cable to connect the printer to the computer. If the printer is connected to a network, such as a local area network, the computer has to be able to access the printer through the network. This likely requires the computer to be connected to the network, execute software to communicate over the network, and know the printer's network (e.g., IP) address. Finally, the computer needs to execute software (e.g., printer driver) that enables the computer to communicate with the printer.

The advent and development of data networks, such as the Internet, provide an alternative to carrying large amounts of printed material or carrying and configuring a laptop computer to properly communicate with different types of printers. For example, a salesperson can load and store the product documents on his or her company's web site on the Internet. The salesperson, at the client's facility, can use a client's computer having access to the Internet to connect to the web site. Once connected, the salesperson can download the appropriate product documents onto the computer and print the downloaded documents on a connected printer. While this alleviates the inconvenience of carrying a laptop computer to a client's facility and configuring the computer at the facility, there still exists the need to download and store the data on a computer connected to both the Internet and a printer.

Another alternative is for a salesperson to load the product documents onto a removable storage device such as a diskette or compact disk. The salesperson can then use a computer at a client's facility to access the product documents stored on the disk and print the documents on an attached printer. Here, the salesperson needs to find and have access to a computer that can properly read the product documents stored on the disk. This likely requires the software application product used in creating the product documents to be loaded and executed on the client's computer. A computer executing the same software application product may not be available at the client's facility, in which case, the product documents on the disk cannot be printed.

Accordingly, an improved system and method for printing data stored on a computer from a remote location, that alleviates the inconveniences and deficiencies commonly associated with current methods of printing, is desirable.

SUMMARY

The present disclosure is directed to a system and corresponding methods that facilitate the printing of one or more remotely stored documents by accessing the remote documents directly from a printer. The printer receives a request to print the documents from an information appliance. The printer then initiates a connection with, and receives the documents from, a mailbox server on which the documents are stored, and subsequently prints the documents.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method performed on an application appliance for printing a document stored on a remote computer includes: providing a connection between an information appliance and a remote computer, wherein the remote computer stores one or more documents; receiving synchronization information from the remote computer, the synchronization information includes one or more reference information, wherein each reference information identifying a document stored on the remote computer; displaying the reference information on an information appliance display; receiving a selection of one or more documents from the displayed reference information; receiving a command to print the one or more selected documents; and responsive to receiving the command to print, transmitting a print request to a nearby printer.

In another embodiment, a method for printing a document stored on a remote computer by directly accessing the document from a remote printer includes: receiving a print request to print one or more documents stored on a remote computer, the print request being transmitted from an application appliance; establishing a network connection to the remote computer; transmitting a request to the remote computer to receive the contents of the one or more documents specified in the received print request; receiving the contents of the one or more documents from the remote computer; and printing the received contents of the one or more documents.

In still another embodiment, a computer-readable storage medium having stored thereon computer instructions that, when executed by an information appliance, cause the information appliance to: provide a connection between an information appliance and a remote computer, wherein the remote computer stores one or more documents; receive synchronization information from the remote computer, the synchronization information includes one or more reference information, each reference information identifying a document stored on the remote computer; display the reference information on an information appliance display; receive a selection of one or more documents from the displayed reference information; receive a command to print the one or more selected documents; and transmit a print request to a nearby printer in response to receiving the command to print.

In yet another embodiment, a computer-readable storage medium having stored thereon computer instructions that, when executed by a printer, cause the printer to: receive a print request to print one or more documents stored on a remote computer, the print request being transmitted from an application appliance; establish a network connection to the remote computer; transmit a request to the remote computer to receive the contents of the one or more documents specified in the received print request; receive the contents of the one or more documents from the remote computer; and print the received contents of the one or more documents.

These and other embodiments of the present invention will also become readily apparent to those skilled in the art from the following detailed description of the embodiments having reference to the attached figures, the invention not being limited to any particular embodiment(s) disclosed.

DETAILED DESCRIPTION

Figure 1:
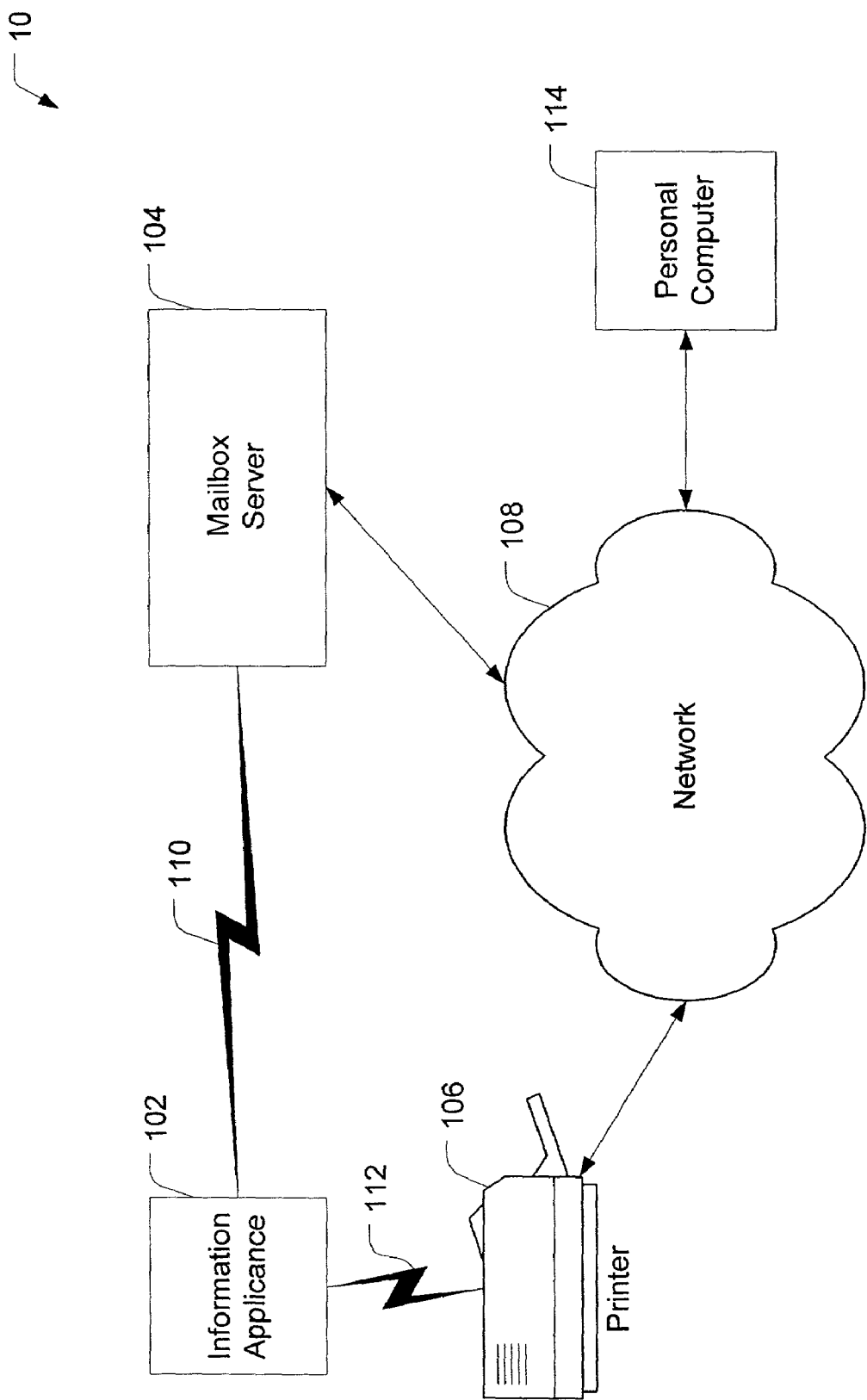
FIG. 1 is a diagram illustrating an environment in which a system of the present invention may operate.

A mailbox printing service system and corresponding methods, according to an embodiment of the present invention, facilitates the printing of one or more remotely stored documents using an information appliance. The information appliance stores and displays a list of one or more documents stored, for example, in a mailbox on a mailbox server. The information appliance issues a request to print one or more of the documents on a printer. The request is transmitted to the printer, for example, over a wireless network connection. The printer then obtains the contents of the one or more requested documents from the mailbox server and prints the received document contents.

"Document" here generally refers to an identifiable collection of data and/or information. Examples of documents include text files, e-mail messages, documents created using word processing applications, and the like. "Information appliance" here generally refers to a handheld consumer device that is typically controlled by a microprocessor, performs a limited number of tasks, and provides a touch screen interface, push buttons, or both. Examples of information appliances include personal digital assistants (PDAs), cellular or mobile phones, hand-held computers, electronic books, and the like.

In one embodiment, the mailbox server maintains the documents in one or more mailboxes. A mailbox typically belongs to, or is associated with a user identified on the mailbox server. Thus, a user identified on the mailbox server has his or her own mailbox. "Mailbox" here generally refers to an area, for example, in memory or on a storage device, where electronic data (e.g., document files, e-mails, etc.) is placed. The mailbox server may also provide one or more interfaces through which a user can generally manage (e.g., add, delete, copy, modify, print, etc.) the contents of his or her mailbox.

For example, a user can place one or more documents in his or her mailbox maintained on the mailbox server. The user then synchronizes his or her information appliance with the list of documents contained in his or her mailbox. Subsequently, the user can proceed to a printer, for example, at a location remote from the mailbox server, and display the document list on the information appliance. Using the information appliance, the user can select one or more documents from the displayed document list and select an option to print. The information appliance transmits, for example, over a wireless connection, the print request to the printer. The printer receives the print request, requests the contents of the selected documents from the mailbox server, and prints the documents.

Embodiments of the present invention are understood by referring to FIGS. 1–9 of the drawings. Throughout the drawings, components that correspond to components shown in previous figures are indicated using the same reference numbers.

Nomenclature

The detailed description that follows is presented largely in terms of processes and symbolic representations of operations performed by conventional computers and computer components, including information appliances. A computer may be any microprocessor or processor (hereinafter referred to as processor) controlled device such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a writing stylus, a microphone, or a touch screen, and output devices such as a computer screen, printer, or a speaker. Additionally, the computer includes memory such as a memory storage device or an addressable storage medium. The computer may be equipped with a network communication device such as a network interface card, a modem, or other network connection device suitable for connecting to one or more networks.

The computer may be a uniprocessor or multiprocessor machine. Additionally the computer, and the computer memory, may advantageously contain program logic or other substrate configuration representing data and instructions, which cause the computer to operate in a specific and predefined manner as, described herein. The program logic may advantageously be implemented as one or more modules. The modules may advantageously be configured to reside on the computer memory and execute on the one or more processors. The modules include, but are not limited to, software or hardware components (hereinafter referred to as components) that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as, by way of example, read-only memory (ROM).

Mailbox Printing Service System

Referring now to the drawings, FIG. 1 illustrates an environment in which a mailbox printing service system 10, according to one embodiment, may operate. The environment includes an information appliance 102, a mailbox server 104, a printer 106, and a data network (e.g., the Internet) 108. The information appliance 102 is connected to the mailbox server 104 by a connection 110, and the information appliance 102 is connected to the printer 106 by a connection 112. The mailbox server 104 and the printer 106 are connected to the network 108. The environment also includes a user computer 114 connected to the network 108.

As used herein, the terms "connected," "coupled," or any variant thereof, means any connection or coupling, either direct or indirect, between two or more elements; the coupling or connection between the elements can be physical, logical, or a combination thereof. Also, the term "mailbox server" as used herein, is to be viewed as a designation of one or more computers and is not to be otherwise limiting in any manner. The mailbox server 104 may, for example, be comprised of one or more modules that execute on one or more computers.

The mailbox printing service system 10 generally functions to provide a user the ability to "walk up" to the printer 106 with his or her information appliance 102 and print one or more documents that are stored in a mailbox on a remote mailbox server 104. The information appliance 102 was previously synchronized with a list of documents in the user's mailbox. For example, the user can connect his or her information appliance 102 to mailbox server 104 using connection 110 and request and receive the list of documents in his or her mailbox. The user then walks up to printer 106 and selects a specific document from the list of documents displayed on his or her information appliance 102, and selects an option to print on the information appliance 102. The information appliance 102 transmits the print request, including the necessary information (e.g., document reference, user identification, etc.), to printer 106 over connection 112. The printer 106 receives the print request and retrieves the contents of the referenced document from the user's mailbox on mailbox server 104 over network 108. Printer 106 then prints the retrieved document.

Network 108, connection 110, and connection 112 may advantageously facilitate the transfer of electronic content. Network 108 generally functions to provide connectivity between connected devices, such as, by way of example, computers and computer components. In one embodiment, the network 108 includes the Internet. The Internet is a global network connecting millions of computers and computer components, including the mailbox server 104 and printer 106. The structure of the Internet, which is well known to those of ordinary skill in the art, is a global network of computer networks and utilizes a simple, standard common addressing system and communications protocol known as Transmission Control Protocol/Internet Protocol (TCP/IP). The connections between different networks are called "gateways," and the gateways serve to transfer electronic data worldwide.

One of ordinary skill in the art will appreciate that the Internet may advantageously be comprised of one or a combination of other types of networks without detracting from the scope of the invention. The Internet can include, by way of example, local area networks (LANs), wide area networks (WANs), public internets, private intranets, a private computer network, a secure internet, a private network, a public network, a value-added network, interactive television networks, wireless data transmission networks, two-way cable networks, satellite networks, interactive kiosk networks, and/or any other suitable data network.

Connection 110 generally functions to provide connectivity between the information appliance 102 and the mailbox server 104. For example, the information appliance 102 communicates with the mailbox server 104 over connection 110 to synchronize with the contents of a mailbox maintained on mailbox server 104. The request to obtain a document list identifying the documents in a mailbox, as well as the document list, is transmitted over connection 110.

In one embodiment, the connection 110 may provide a physical connection between the information appliance 102 and the mailbox server 104. Connection 110 may include a base or docking station that is coupled to the mailbox server 104 by, for example, a serial connection, a parallel connection, a small computer system interface (SCSI) connection, universal serial bus (USB) connection, etc., or a combination of the various types of connections, including the network 108 and one or more computers. For example, the docking station may be coupled to a computer that is coupled to the mailbox server 104 through the network 108. The mailbox server 104 contains program logic and components that provide communication capability with the coupled docking station. The information appliance 102 contains program logic and components that enable connecting to, and communicating with the docking station, thus creating the connection 110 to the mailbox server 104.

In one embodiment, the connection 110 may provide a wireless connection between the information appliance 102 and the mailbox server 104. The information appliance 102 and mailbox server 104 may contain program logic and components that support a wireless technology, including, without limitation, the Bluetooth specification (Bluetooth technology), which facilitates communication between the information appliance 102 and the mailbox server 104. For example, the information appliance 102 may call and connect to the mailbox server 104 over a wireless telephone network. The wireless telephone network may utilize the network 108 in providing the connection 110 between the information appliance 102 and the mailbox server 104. The Bluetooth technology is further discussed below. In another embodiment, the connection 110 may utilize and be made over the network 108.

Connection 112 generally functions to provide connectivity between the information appliance 102 and the printer 106. For example, the information appliance 102 communicates with the printer 106 over connection 112 to request the printing of one or more documents contained in a mailbox maintained on mailbox server 104. The print request is transmitted over connection 112. In one embodiment, the printer 106 may transmit a print status message to the information appliance 102 over connection 112.

In one embodiment, connection 112 conforms to the Bluetooth protocol and specification (Bluetooth technology). Thus, the information appliance 102 and the printer 106 contain program logic and components that provide communication capability that conforms to the Bluetooth technology. As is appreciated by those of ordinary skill in the art, the Bluetooth technology specification provides interoperability guidelines to facilitate communication between computing devices that conform to the Bluetooth technology. Bluetooth technology specifies a short-range, wireless (e.g., radio) networking protocol for connecting various devices, such as, by way of example, mobile phones, PDAs, laptop computers, desktop computers, etc. Furthermore, the Bluetooth specification defines power levels that facilitate communication between Bluetooth conformant devices over a limited distance. Thus, the Bluetooth conformant devices need to be near each other to communicate.

One of ordinary skill in the art will appreciate that connection 112 can conform to any number of wireless communication technologies, such as, by way of example, infrared (IR) communication technology, IEEE 802.11, etc., that provide communication between devices that conform to the particular wireless technology. Both the information appliance 102 and the printer 106 contain program logic and components that make the respective device conform to the wireless communication technology in order to enable interoperability between the devices.

Figure 2:
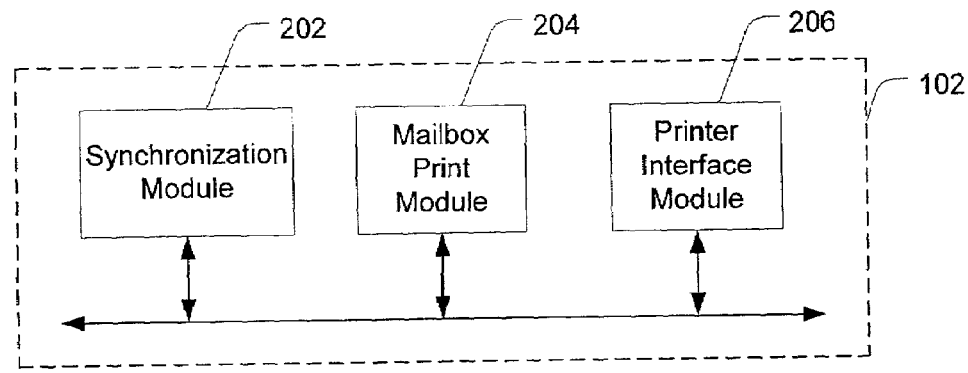
FIG. 2 illustrates components of an information appliance, according to one embodiment.

The information appliance 102 generally functions to provide its user the ability to print one or more documents in his or her mailbox maintained on the mailbox server 104 on a remotely located printer 106 by issuing a print command on the information appliance 102. The information appliance 102 contains program logic and components to facilitate communication with the mailbox server 104 over an instance of connection 110, and communication with the printer 106 over an instance of connection 112. FIG. 2 illustrates components of the information appliance 102, according to one embodiment. As depicted, the information appliance 102 includes a synchronization module 202, a mailbox print module 204, and a printer interface module 206. The modules 202, 204, and 206 are connected.

The synchronization module 202 generally functions to provide synchronization with the contents of a mailbox maintained on the mailbox server 104. The synchronization module 202 contains program logic and components to communicate with the mailbox server 104 over an instance of connection 110. In one embodiment, the synchronization module 202 provides the information appliance 102 user an option to synchronize with his or her mailbox maintained on the mailbox server 104. Subsequent to receiving a synchronize request, the synchronization module 202 may create an instance of connection 110 and transmit user identification information and a request to synchronize with the user's mailbox to the mailbox server 104 over the instance of connection 110. The synchronization module 202 receives the synchronization information (e.g., reference information regarding the items in the mailbox) from the mailbox server 104 over the instance of connection 110 and stores the information on the information appliance 102 for subsequent use by its user.

The user identification information includes, by way of example, user login and password that identifies a mailbox maintained on the mailbox server 104. In one embodiment, the synchronization module 202 receives the user identification information from, for example, the information appliance 102 user. For example, the user may enter the user identification information through a menu using an input mechanism, such as a writing stylus, keypad, etc., provided on the information appliance 102. In another embodiment, the synchronization module 202 may retrieve the user identification information from memory. For example, the information appliance 102 may have previously received the user identification information input by its user, and stored the user identification information in memory for subsequent use.

In one embodiment, the synchronization information includes information that permits the items in the mailbox to be properly identified or referenced. The information may include, for example, each item's Uniform Resource Locator (URL), filename, reference number, identification number, or any other identification information that enables the item to be identified by the mailbox server 104.

The mailbox print module 204 generally functions to provide a user the ability to submit a request to print one or more items in his or her mailbox. The mailbox print module 204 contains program logic and components to provide an interface through which a user can interact with the information appliance 102 and, in particular, the contents of his or her mailbox maintained on a remote mailbox server 104. In one embodiment, the mailbox print module 204 displays the information regarding the items in the user's mailbox on, for example, a screen on the information appliance 102. The information regarding the mailbox items may be derived from the previously received synchronization information. The mailbox print module 204 receives a selection of one or more items and a request to print the one or more selected items. The mailbox print module 204 may transmit the print request to the printer 106 utilizing the printer interface module 206.

In one embodiment, the print request includes information, such as, by way of example, user or mailbox identification, information identifying the one or more selected items in the mailbox, information identifying the mailbox server 104, and the like. The mailbox print module 204 may display an interface on the information appliance's 102 display through which the user can provide some or all of the information included in the print request. In another embodiment, the information appliance 102 may maintain the user or mailbox information, and mailbox server 104 identification information in memory. For example, the information appliance 102 may have received this information during synchronization with the mailbox server 104. In this instance, the mailbox print module 204 receives the selection of one or more items from the user and retrieves the other necessary information from memory.

The printer interface module 206 generally functions to facilitate communication between the information appliance 102 and the printer 106. The printer interface module 206 contains program logic and components to establish an instance of the connection 112 to the printer 106 and transmit the print request received from the mailbox print module 204. The printer interface module 206 receives the print request from the mailbox print module 204 and transmits the print request to printer 106.

In one embodiment, the printer interface module 206 conforms to the Bluetooth technology, making the information appliance 102 a Bluetooth conformant device capable of communicating with other Bluetooth conformant devices. Here, the printer 106 also conforms to and is compliant with the Bluetooth technology, making communication between the information device 102 and the printer 106 possible. In another embodiment, the printer interface module 206 and the printer 106 both conform to a wireless communication technology, such as, by way of example, IR, IEE 802.11, etc.

In one embodiment, the printer interface module 206 contains program logic that interprets and converts the print request into a format or protocol that is understood by the printer 106. For example, the print request may be transmitted in a first format or protocol by the mailbox print module 204 to the printer interface module 206. The printer interface module 206 then converts the print request into a format or protocol that is understood by the printer 106. The printer interface module 106 then establishes an instance of the connection 112 to the printer 106 and transmits the print request.

The mailbox server 104 generally functions as a repository for documents belonging to one or more users. The mailbox server 104 contains program logic and components to facilitate communication with the information appliance 102 over an instance of connection 110, and communication with the printer 106 over network 108. The mailbox server 104 provides, for example, secured access to the documents maintained on the mailbox server 104. Examples of mailbox server 104 include, without limitation, a simple file system (e.g., each document is stored as a file in the file system and directories are used for organization by the user), an email server (e.g., each document is stored as an email message and users are organized based on the email system infrastructure), a web server (e.g., documents are stored as URLs on the web server and the URL structure is organized by the user), a document management server (e.g., documents are stored using a document management infrastructure), and a database (e.g., documents are stored as entries in a database system).

Figure 3:
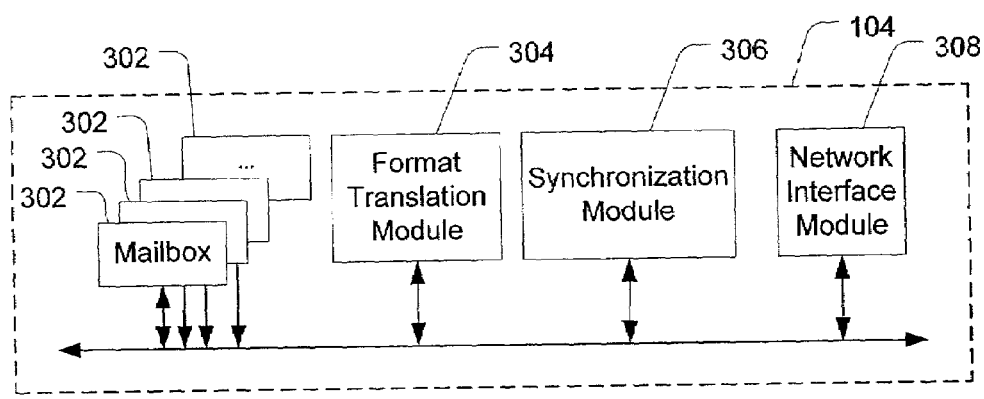
FIG. 3 illustrates components of a mailbox server, according to one embodiment.

FIG. 3 illustrates components of the mailbox server 104, according to one embodiment. As depicted, the mailbox server 104 includes one or more mailboxes 302, a format translation module 304, a synchronization module 306, and a network interface module 308. The mailboxes 302 and the modules 304, 306, and 308 are connected.

The mailbox 302 is associated with (e.g., belongs to, is identified with, etc.) a user identified or registered on the mailbox server 104. The mailbox 302 generally functions as a "placeholder" for the documents belonging to its associated user. In one embodiment, the mailbox server 104 contains program logic that facilitates the creation and maintenance of a mailbox 302 by a user. A user can, for example, through a provided interface, access and register with the mailbox server 104. The mailbox server 104 receives user identification and registration information from the user and creates a mailbox 302 for the user. Subsequently, the user's documents may be maintained in his or her mailbox 302. Each document in the mailbox 302 is associated with identification or reference information enabling the mailbox server 104 to distinguish one document from another in the mailbox 302. For example, a document may be identified or referenced by a URL, filename, reference number, identification number, etc., or any combination thereof.

In one embodiment, the mailbox server 104 provides one or more interfaces through which a registered user can administer the contents of his or her mailbox. The user may utilize the interface and perform operations, such as, by way of example, add one or more documents into his or her mailbox 302, retrieve one or more documents from his or her mailbox 302, remove one or more documents from his or her mailbox 302, transmit one or more documents in his or her mailbox 302, and the like. The one or more interfaces may be accessed over a network from a remote computer. For example, the user may use his or her personal computer 114 and connect to the mailbox server 104 over the network 108. The user may then access his or her mailbox 302 from his or her personal computer 114.

In one embodiment, the mailbox server 104 provides one or more application interfaces through which the mailboxes 302 can be accessed. An application or device may request access to a particular mailbox 302 through a provided application interface. For example, the mailbox server 104 may provide an e-mail service. A user can register with the e-mail service provided by the mailbox server 104. Subsequent to receiving the registration information, the mailbox server 104 can create a mailbox 302 for the user. The mailbox server 104 and, in particular, the e-mail service application can then receive the user's e-mail messages and place or store the e-mail messages in the user's mailbox 302 through a provided application interface.

In another example, the mailbox server 104 may provide a filing or repository service. A user can register with the mailbox server 104 for the filing service. Subsequent to receiving the registration information, the mailbox server 104 can create a mailbox 302 to hold the user's documents. The user can then use or execute a word processing application on his or her personal computer 114 to create a document. Through the application, the user can request to save the document in his or her mailbox 302 on the mailbox server 104. The word processing application, or other program logic on the personal computer 114, can then access the user's mailbox 302 through a provided application interface on the mailbox server 104 and store the document.

The format translation module 304 generally functions to provide interoperability between the mailbox server 104 and the printer 106 by converting a document to a format that is comprehensible by the printer 106. The format translation module 304 contains program logic to receive a target format information and a document's contents. The format translation module 304 then converts the document's contents into the target format. The target format may be a format that is readily printable on the printer 104.

For example, the printer 104 may be a postscript printer and a requested document may be a Word document (e.g., the document contents are in Word format). The format translation module 304 receives a request to convert the document contents from the Word format to the postscript format, thus, transforming the document's contents into a format that is readily printable on the printer 104.

In one embodiment, the format translation module 304 may receive a printer identification or model and a document identification. The format translation module 304 may then retrieve the printer format associated with the printer identification from, for example, a printer format table. The printer format table may include information such as, by way of example, printer identification, printer model, printer format, and the like. The format translation module 304 may retrieve the contents of the identified document form the appropriate mailbox 302 and convert the contents into the corresponding printer format. The printer format table may be administered and maintained by the provider or administrator of the mailbox server 104.

The synchronization module 306 generally functions to provide synchronization with the information appliance 102. The synchronization module 306 contains program logic and components to communicate with the information appliance 102 over an instance of connection 110. In one embodiment, the synchronization module 302 enables the information appliance 102 to create an instance of connection 110 to the mailbox server 104. The synchronization module 306 receives a request to synchronize with the contents of a particular mailbox 302 over connection 110. The synchronization module 306 validates the request (e.g., verifies user and mailbox identification) and transmits the synchronization information (e.g., information to identify the documents in the mailbox) to the coupled information appliance 102 over connection 110.

The network interface module 308 generally functions to provide connectivity between the mailbox server 104 and the network 108. The network interface module 308 contains program logic and components to enable interoperable communication between the mailbox server 104 and other devices connected or connectable to the network 108. The network interface module 308 provides the printer 106 and the users using personal computers 114, access to the mailbox server 104 over the network 108. In another embodiment, the network interface module 308 provides the information appliance 102 access to the synchronization module 306 over the network 108.

For example, the printer 106 may transmit a network packet requesting the contents of a document in a particular mailbox 302 to the mailbox server 104 over the network 108. The network interface module 308 receives the network packet transmitted over the network 108. The network interface module 308 may process the networking protocol components contained in the network packet and determine that the received packet is requesting the contents of a document. In one embodiment, the network interface module 308 may include program logic enabling it to process the request by retrieving the requested document contents from the mailbox 302. In another embodiment, the network interface module 308 may invoke one or more other modules that contain program logic to process the request. Subsequently, the network interface module 308 transmits one or more network packets containing the document contents to the printer 104.

Figure 4:
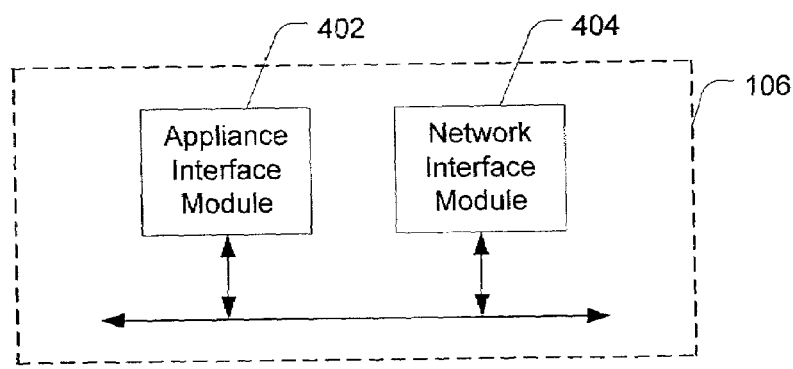
FIG. 4 illustrates components of a printer, according to one embodiment.

The printer 106 generally functions to convert electronic documents into paper documents. The printer 106 contains program logic and components to facilitate communication with the information appliance 102 over an instance of connection 112, and communication with the mailbox server 104 over network 108. FIG. 4 illustrates components of the printer 106, according to one embodiment. As depicted, the printer 106 includes an appliance interface module 402 connected to a network interface module 404.

The appliance interface module 402 generally functions to facilitate communication between the printer 106 and the information appliance 102. The appliance interface module 106 contains program logic and components to establish an instance of connection 112 with the information appliance 102 and receive a print request from the information appliance 102 over the connection 112. The appliance interface module 402 identifies the items requested in the print request, obtains the contents of the identified items from the mailbox server 104, and prints the received contents on printer 106.

In one embodiment, the appliance interface module 402 contains program logic to receive a request to establish an instance of connection 112 from an information appliance 102. The appliance interface module 402 may acknowledge the connection request and receive a print request over the established connection 112. The appliance interface module 402 may receive as part of the print request information such as, by way of example, user or mailbox identification, the mailbox server 104 address, a list of one or more items in the mailbox, and the like. The appliance interface module 402 may request the contents of the one or more items specified in the print request from the mailbox server 104. Subsequent to receiving the contents from the mailbox server 104, the appliance interface module 402 may utilize one or more other modules and components of the printer 106 to print the received contents.

In one embodiment, the appliance interface module 402 conforms to the Bluetooth technology, making the printer 106 a Bluetooth conformant device capable of communicating with other Bluetooth conformant devices. Here, the information appliance 102 also conforms to and is compliant with the Bluetooth technology, making communication between the printer 106 and the information appliance 102 possible. In another embodiment, the appliance interface module 402 conforms to a wireless communication protocol also supported by the communicating information appliance 102.

The network interface module 404 generally functions to provide connectivity between the printer 106 and the network 108. The network interface module 404 contains program logic and components to enable interoperable communication between the printer 106 and other devices connected or connectable to the network 108. In one embodiment, the appliance interface module 402 utilizes the network interface module 404 to communicate with the mailbox server 104 over network 108.

For example, the network interface module 404 receives data and information to transmit over the network 108 from the appliance interface module 402. The data may include information identifying the mailbox server 104 and a request to obtain the contents of one or more items in a mailbox 302. The network interface module 404 establishes a connection over the network 108 with the mailbox server 104, and may transmit a network packet requesting the contents of one or more items in the mailbox 302 maintained on the mailbox server 104. The network interface module 404 then receives one or more network packets containing the contents of the specified items from mailbox server 104 and sends the received contents to the appliance interface module 402 for further processing (e.g., printing on the printer 106).

Mailbox Printing Process

Figures 5, 6:
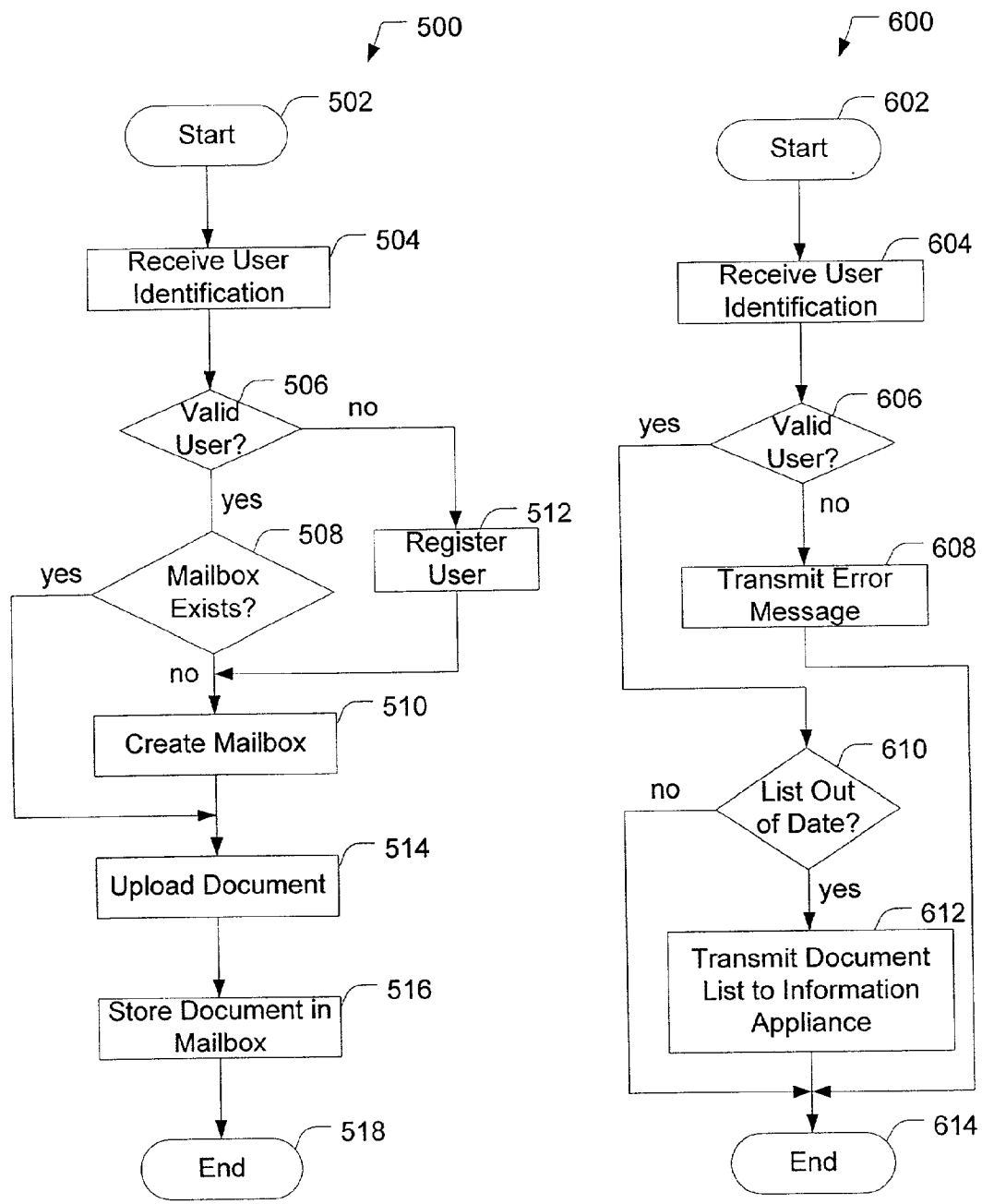
FIG. 5 illustrates a flow chart of an exemplary method for storing a document on a mailbox server, according to one embodiment.
FIG. 6 illustrates a flow chart of an exemplary method for synchronizing a document list on an information appliance with the current contents of a user's mailbox, according to one embodiment.

FIG. 5 illustrates a flow chart of an exemplary method 500 for storing a document on the mailbox server 104, according to one embodiment. Beginning at a start step 502, a user creates a document on, for example, his or her personal computer 114. The user then accesses the mailbox server 104 over network 108 from his or her personal computer 114. For example, the mailbox server 104 may support or provide a web site that is accessible over the Internet. The user can then access the mailbox server 104 web site by executing a software program, generally known as a "browser," on his or her personal computer 114. The mailbox server 104 web site may display an interface (e.g., web page) on the personal computer 114 requesting the user to provide user identification information to further access the mailbox server 104.

At step 504, the mailbox server 104 receives user identification information, such as, by way of example, user login and password, input by the user. At step 506, the mailbox server 104 determines if the received user identification information corresponds to a valid user of the mailbox server 104. For example, the mailbox server 104 may maintain a database of registered users of the mailbox server 104. The mailbox server 104 can then check to see if the received user identification is found in this database.

If, at step 506, the mailbox server 104 determines that the user is not a valid user, the mailbox server 104 may provide the user an option to register step 512. For example, the mailbox server 104 may request registration information from the user through one or more interfaces. Subsequent to receiving the requested user information, the mailbox server 104 creates a mailbox 302 for the user at step 510. The mailbox server 104 then uploads the document at step 514.

If, at step 506, the mailbox server 104 determines from the received user identification information that the user is a valid user, the mailbox server 104 uploads the document at step 514. In one embodiment, the mailbox server 104 may provide an option, for example, through an interface for the user to upload a document onto the mailbox server 104. In another embodiment, the user can specify the mailbox server 104, for example, as part of the filename on the user computer 114 in specifying the target file to store the document. At step 516, the mailbox server 104 stores the received document contents in the user's mailbox 302 and ends at step 518.

Those of ordinary skill in the art will appreciate that, for this and other methods disclosed herein, the functions performed in the exemplary flow charts may be implemented in differing order. Furthermore, steps outlined in the flow charts are only exemplary, and some of the steps may be optional, combined into fewer steps, or expanded into additional steps without detracting from the essence of the invention.

FIG. 6 illustrates a flow chart of an exemplary method 600 for synchronizing a document list on an information appliance 102 with the current contents of a user's mailbox 302, according to one embodiment. Beginning at a start step 602, a user connects his or her information appliance 102 to the mailbox server 104 through an instance of connection 110. The user then selects on his or her information appliance 102 an option to synchronize with the mailbox server 104. The user may be prompted to select an application program to synchronize with on the mailbox server 104. In one embodiment, the user may be prompted to provide user identification information. In another embodiment, the user's information appliance 102 may transmit the user's identification information on behalf of the user.

At step 604, the mailbox server 104 receives the user's identification information, for example, over the connection 110. At step 606, the mailbox server 104 verifies the received user identification information to determine if it corresponds to a valid user (e.g., a registered user of the mailbox server 104). If the user is not a valid user, the mailbox server 104 transmits, for example, over connection 110, an error message to the information appliance 102 at step 608. The mailbox server 104 then ends at step 614.

If, at step 606, the mailbox server 104 determines that the received user identification information corresponds to a valid user, then the mailbox server 104 determines if the document list currently on the information appliance 102 is out of date at step 610. In one embodiment, the mailbox server 104 transmits a request, for example, over connection 110 requesting that the information appliance 102 transmit the document list currently stored on the information appliance. The mailbox server 104 may then compare the document list received from the information appliance 102 with the documents in the user's mailbox 302 to determine if the document list on the information appliance 102 is out of date.

In another embodiment, the information appliance 102 may maintain a timestamp that records the last time the document list was received from the mailbox server 104. The mailbox server 104 may then transmit a request to the information appliance 102 for the timestamp. The mailbox server 104 may then compare the received timestamp to the timestamps of each document in the mailbox 302 to determine if the document list on the information appliance 102 is out of date.

If, at step 610, the mailbox server 104 determines that the document list on the information appliance 102 is not out of date (e.g., is current with the documents in the mailbox 302), then the mailbox server 104 ends at step 614. If the mailbox server 104 determines that the document list on the information appliance 102 is out of date, the mailbox server 104 transmits a current document list to the information appliance 102 at step 612. The current document list includes reference information that identifies the documents currently in the user's mailbox 302. The mailbox server 104 then ends at step 614.

Figure 7:
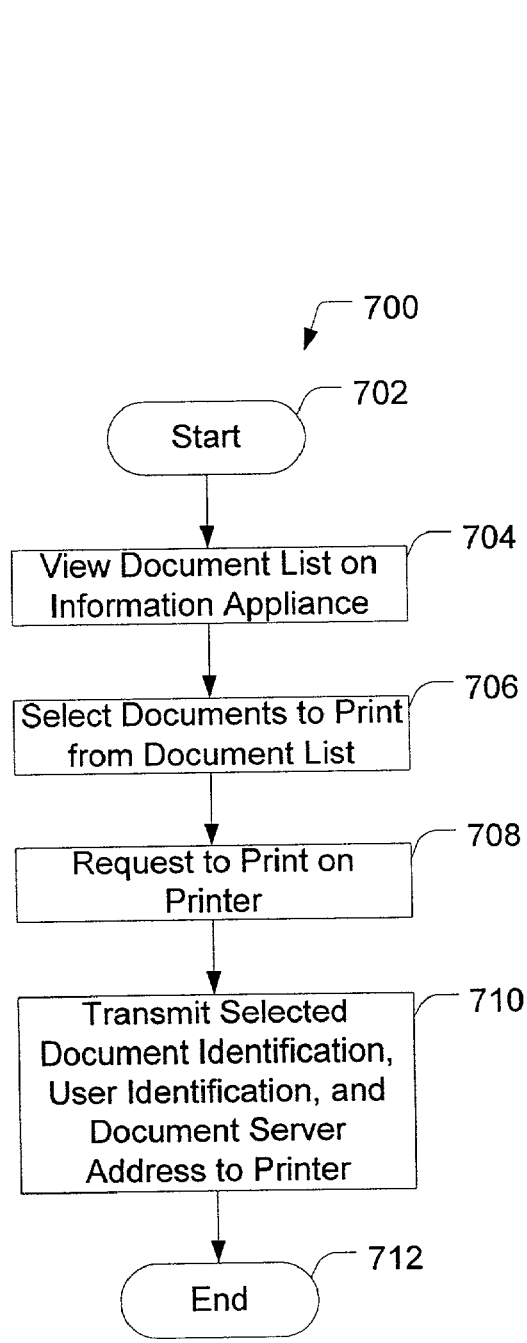
FIG. 7 illustrates a flow chart of an exemplary method for requesting a printing of a document from an information appliance, according to one embodiment.

FIG. 7 illustrates a flow chart of an exemplary method 700 for requesting a printing of a document from an information appliance 102, according to one embodiment. Beginning at a start step 702, a user selects an option on his or her information appliance 102 to display a list of documents contained in his or her mailbox 302. The list of documents is maintained on the information appliance 102. In another embodiment, the information appliance 102 may initiate an instance of connection 110 to the mailbox server 104 and request the list of documents contained in the user's mailbox 302.

At step 704, the information appliance 102 displays the list of documents contained in the user's mailbox 302 on the information appliance 102 display screen, and the user views the displayed document list. The information appliance 102 may provide the capability to browse the list of documents and select one or more documents for printing on a nearby, remote printer 106. At step 706, the user selects one or more documents to print from the displayed document list. For example, the user may use one or more keys, a dial, or writing stylus provided on the information appliance 102 to view and select one or more documents from the document list. At step 708, the user selects an option to print the selected documents. In one embodiment, the user is near the printer 106 when the user selects the option to print the selected documents.

At step 710, the information appliance 102 transmits to the printer 106 the information necessary for the printer 106 to obtain and print the selected documents. For example, the printer interface module 206 component of the information appliance 102 may transmit information that is necessary to adequately reference the selected documents on the mailbox server 104, user identification information to access the mailbox server 104, and identification information to identify the proper mailbox server 104. The printer interface module 206 transmits the information over an instance of connection 112 to the printer 106. The information appliance 102 then ends at step 712.

Figure 8:
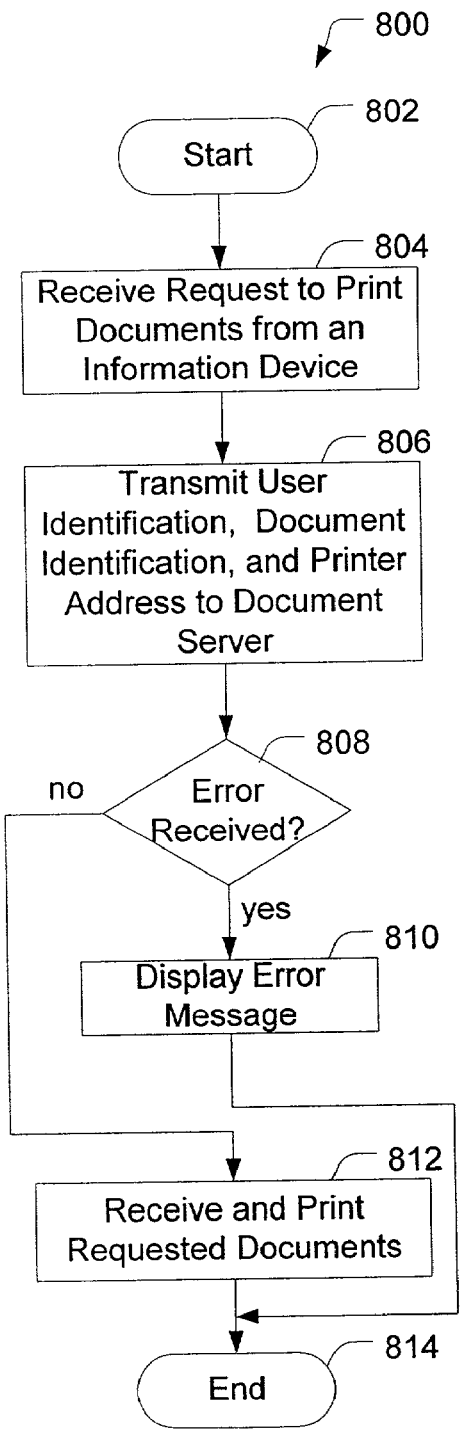
FIG. 8 illustrates a flow chart of an exemplary method for requesting a document in a user's mailbox from a printer, according to one embodiment.

FIG. 8 illustrates a flow chart of an exemplary method 800 for requesting a document in a user's mailbox 302 from the printer 106, according to one embodiment. Beginning at a start step 802, the printer 106 receives a print request transmitted by an information appliance 102 over an instance of connection 112 at step 804. For example, the appliance interface module 402 component of the printer 106 may establish an instance of connection 112 and receive the print request from the information appliance 102. In one embodiment, the print request includes, by way of example, reference information to identify one or more documents, user identification information, and information to identify and address the proper mailbox server 104.

At step 806, the printer 106 transmits a request to the mailbox server 104 to obtain the contents of the one or more documents specified in the print request received from the information appliance 102. In one embodiment, the printer 106 establishes a connection with the mailbox server 104 over the network 108. The printer 106 then transmits the user identification to gain access to the mailbox server 104 and, in particular, the user's mailbox 302 (e.g., the mailbox 302 containing the documents specified in the print request). The mailbox server 106 then requests the contents of the one or more documents specified in the print request received from the information appliance 102. For example, the printer 106 may transmit one or more URLs that respectfully identify or reference the one or more documents specified in the print request.

At step 808, the printer 106 determines if an error condition occurred. For example, an error message may have been received from the mailbox server 104. If an error message is received, the printer 106, at step 810, displays an error message corresponding to the received error message on, for example, the printer's 106 display screen and ends at step 814. For example, some of all of the information transmitted by the printer 106 to the mailbox server 104 may have been erroneous, resulting in an error condition on the mailbox server 104. As another example, an error may have occurred during the transmission of the requested document contents over the network 108, thus, resulting in an error condition. In another embodiment, the printer 106 may transmit the error message to the information appliance 102 over an instance of connection 112.

If, at step 808, the printer 106 determines that there is no error, the printer 106 receives the contents of the requested documents and prints the received contents at step 812. After printing the contents of the requested documents, the printer 106 ends at step 814. For example, the network interface module 404 component of the printer 106 may establish and maintain a connection with the mailbox server 104 over the network 108. The network interface module 404 may then process the document contents received over the network 108 connection.

Figure 9:
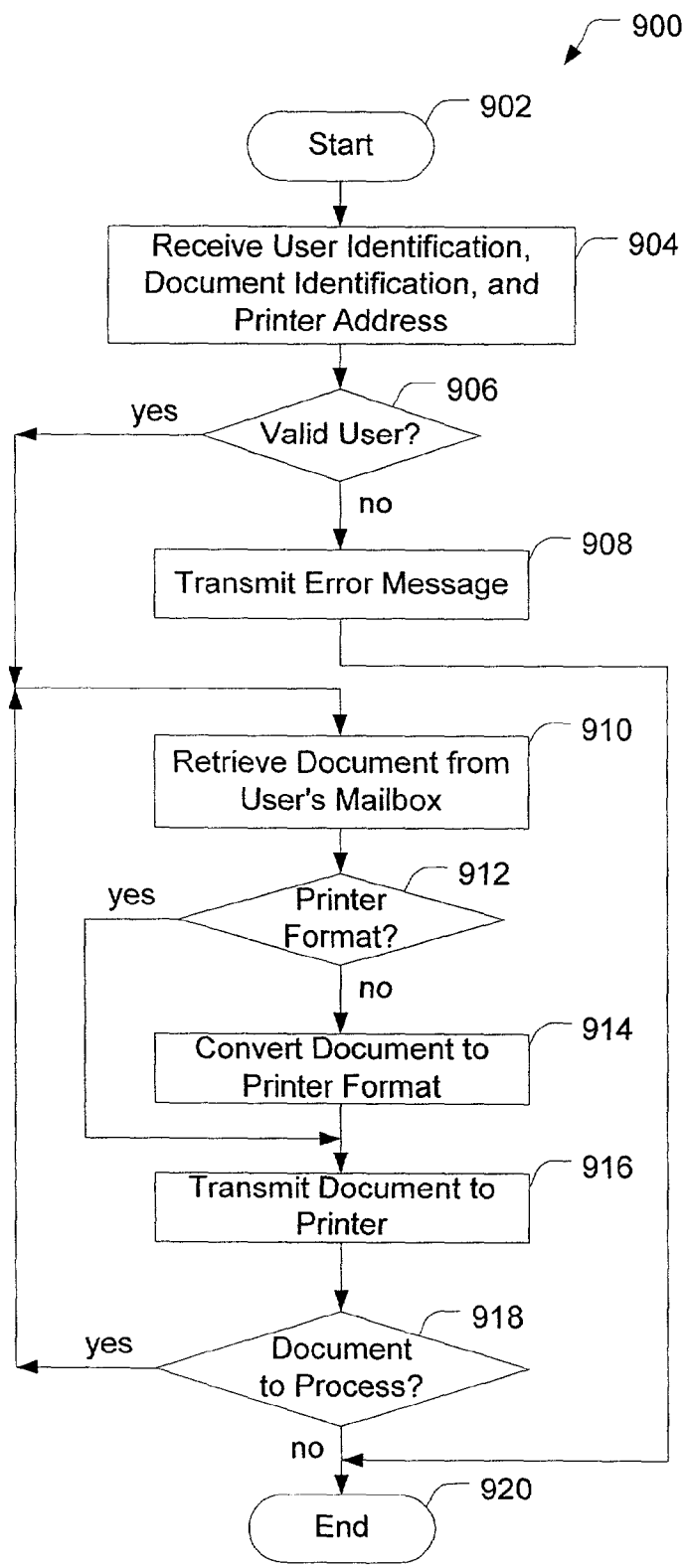
FIG. 9 illustrates a flow chart of an exemplary method for transmitting document contents to a printer, according to one embodiment.

FIG. 9 illustrates a flow chart of an exemplary method 900 for transmitting document contents to a printer 106, according to one embodiment. Beginning at a start step 902, the mailbox server 104 receives a request to obtain the contents of one or more documents maintained in a mailbox 302 on the mailbox server 104 at step 904. In particular, the mailbox server 104 receives, for example, over the network 108, user identification information, reference to one or more documents in the user's mailbox 302, and a printer 104 address or identification. The mailbox server 104 may also receive from the printer 106 information identifying the one or more document formats understood by the printer 106 (e.g., the printable formats).

At step 906, the mailbox server 104 determines if the received user identification information corresponds to a valid user of the mailbox server 104. In one embodiment, the mailbox server 104 may also check to determine that the received document references are valid references to documents contained in the user's mailbox 302. If the mailbox server 104 determines that the user is not a valid user or that a document reference is incorrect, the mailbox server 104 transmits an error message to the printer 106 at step 906 and ends at step 920.

If, at step 906, the mailbox server 104 determines that the user is a valid user and the specified document references are valid, the mailbox server 104 retrieves the contents of the first referenced document from the user's mailbox 302 at step 910. At step 912, the mailbox server 104 determines if the retrieved document contents are in the proper format to be printed on the requesting printer 106. If the retrieved document contents are not in a printable format, then the mailbox server 104 converts the document contents into a format supported by the printer 106 at step 914. For example, the format translation module 304 component of the mailbox server 104 converts the document contents into a format supported by the printer 106.

At step 916, the mailbox server 104 transmits the retrieved document contents (step 910) or converted document contents (step 914) to printer 106 over, for example, the network 108. At step 918, the mailbox server 104 determines if there are more documents to process. The mailbox server 104 determines if all the requested document contents have been transmitted to the requesting printer 106. If there are more requested documents to process, the mailbox server 104 continues processing the next requested document at step 910. If all the requested documents have been processed, the mailbox server 104 ends at step 920.

As described herein, the present invention in at least one embodiment facilitates printing of a remotely stored document using an information appliance. One embodiment of the present invention provides an information appliance that is synchronized with the contents of a user's mailbox maintained on a remote mailbox server. A user then displays the list of documents on the information appliance, selects one or more displayed document references, and selects an option to print the selected documents on the information appliance. The information appliance transmits the print request to a nearby printer. The printer obtains the contents of the selected documents from the mailbox server over a network and prints the document contents.

In at least one embodiment, the present invention provides the ability to print remotely stored documents without having to first download the documents onto a computer locally coupled to a printer. In one embodiment, the printer directly accesses the documents that are stored on a remote mailbox server. A user transmits a request to print one or more documents using an information appliance to a printer over a wireless connection. The printer processes the print request by downloading the requested one or more document contents from a mailbox server over a network connection. The mailbox server stores the one or more requested documents. The printer then prints the received document contents. Thus, the documents are directly printed on a remote printer without first being stored on a computer locally coupled to the printer.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

What is claimed is:

1. A method performed on an information appliance for printing a document stored on a remote computer, the method comprising:
   providing a connection between an information appliance and a remote computer, wherein the remote computer stores one or more documents in a user mailbox;
   transmitting information regarding a list of user mailbox documents stored on the information appliance from the information appliance to the remote computer;
   receiving synchronization information from the remote computer, the synchronization information comprising one or more references to one or more documents stored in the user mailbox that are available to a user for printing;
   updating the list of user mailbox documents stored on the information appliance using the synchronization information received from the remote computer;
   displaying the updated list of user mailbox documents to the user on a display of the information appliance;
   receiving a selection of one or more documents from the displayed list of user mailbox documents;
   receiving a command to print the one or more selected documents; and
   responsive to receiving the command to print, transmitting a print request to a nearby printer that instructs the printer to retrieve the one or more selected documents from the user mailbox and print the one or more selected documents.

2. The method of claim 1, wherein the print request is transmitted over a wireless connection between the information appliance and the nearby printer.

3. The method of claim 2, wherein the wireless connection conforms to the Bluetooth technology.

4. The method of claim 1, wherein the print request comprises mailbox server identification information.

5. The method of claim 1, wherein the print request comprises one or more references identifying the one or more selected documents.

6. The method of claim 1, wherein the print request comprises user identification information.

7. The method of claim 1, wherein the remote computer is a mailbox server.

8. The method of claim 1, wherein the information appliance is a wireless phone.

9. The method of claim 1, wherein the information appliance is a personal digital assistant.

10. The method of claim 1, wherein the information regarding a list of documents stored on the information appliance comprises the list of user mailbox documents currently stored on the information appliance.

11. The method of claim 1, wherein the information regarding a list of documents stored on the information appliance comprises a timestamp that indicates a last time the synchronization information was received from the remote computer.

12. The method of claim 1, wherein the references to documents stored on the remote computer comprise one or more of a Universal Resource Locator (URL), filename, reference number, and an identification number.

13. The method of claim 1, further comprising transmitting user identification information to the remote computer prior to the information regarding a list of documents stored on the information appliance.

14. A computer-readable storage medium having stored thereon computer instructions that, when executed by an information appliance, cause the information appliance to:
   provide a connection between an information appliance and a remote computer, wherein the remote computer stores one or more documents in a user mailbox;
   transmit information regarding a list of user mailbox documents stored on the information appliance from the information appliance to the remote computer;
   receive synchronization information from the remote computer, the synchronization information comprising one or more references to one or more documents stored in the user mailbox that are available to a user for printing;
   update the list of user mailbox documents stored on the information appliance using the synchronization information received from the remote computer;
   display the updated list of user mailbox documents to a user on a display of the information appliance;
   receive a selection of one or more documents from the displayed list of user mailbox documents;

receive a command to print the one or more selected documents; and transmit a print request to a nearby printer in response to receiving the command to print that instructs the printer to retrieve the one or more selected documents from the user mailbox and print the one or more selected documents.

15. The computer-readable storage medium of claim 14, wherein the print request comprises user identification information.

16. The computer-readable storage medium of claim 14, wherein the print request comprises identification information for the remote computer.

17. The computer-readable storage medium of claim 14, wherein the print request is transmitted over a wireless connection between the information appliance and the printer.

18. The computer-readable storage medium of claim 17, wherein the wireless connection conforms to the Bluetooth technology.

19. The computer-readable storage medium of claim 14, wherein the print request comprises one or more references identifying the one or more selected documents.

20. The computer-readable storage medium of claim 14, wherein the computer-readable storage medium is provided in a wireless phone.

21. The computer-readable storage medium of claim 14, wherein the computer-readable storage medium is provided in a personal digital assistant.

22. The computer-readable storage medium of claim 14, wherein the information regarding a list of documents stored on the information appliance comprises the list of user mailbox documents currently stored on the information appliance.

23. The computer-readable storage medium of claim 14, wherein the information regarding a list of documents stored on the information appliance comprises a timestamp that indicates a last time the synchronization information was received from the remote computer.

24. The computer-readable storage medium of claim 14, wherein the references to documents stored on the remote computer comprise one or more of a Universal Resource Locator (URL), filename, reference number, and an identification number.

25. The computer-readable storage medium of claim 14, further comprising computer instructions that, when executed by an information appliance, cause the information appliance to transmit user identification information to the remote computer prior to the information regarding a list of documents stored on the information appliance.

* * * * *